(12) United States Patent
Moudhgalya et al.

(10) Patent No.: US 12,574,738 B2
(45) Date of Patent: Mar. 10, 2026

(54) EMBEDDED SUBSCRIBER IDENTITY MODULE NON-FUNGIBLE TOKEN SYSTEM

(71) Applicant: Bellum, LLC, Reno, NV (US)

(72) Inventors: Mayur Moudhgalya, Salt Lake City, UT (US); Shane Tackett, Salt Lake City, UT (US); Michael Durham, Salt Lake City, UT (US)

(*) Notice: Subject to any disclaimer, the term of this patent is extended or adjusted under 35 U.S.C. 154(b) by 254 days.

(21) Appl. No.: 17/805,365

(22) Filed: Jun. 3, 2022

(65) Prior Publication Data

US 2022/0394484 A1 Dec. 8, 2022

Related U.S. Application Data

(60) Provisional application No. 63/202,259, filed on Jun. 3, 2021.

(51) Int. Cl.
| | |
|---|---|
| *H04W 12/40* | (2021.01) |
| *H04L 9/00* | (2022.01) |
| *H04W 8/20* | (2009.01) |
| *H04W 12/06* | (2021.01) |
| *H04W 12/72* | (2021.01) |

(52) U.S. Cl.
CPC .............. *H04W 12/40* (2021.01); *H04L 9/50* (2022.05); *H04W 8/205* (2013.01); *H04W 12/06* (2013.01); *H04W 12/72* (2021.01); *H04L 2209/80* (2013.01)

(58) Field of Classification Search
CPC ..... H04W 12/40; H04W 8/205; H04W 12/00; H04W 12/72; H04W 12/04; H04W 12/70; H04W 12/08; H04L 9/50; H04L 9/00
See application file for complete search history.

(56) References Cited

U.S. PATENT DOCUMENTS

| | | | | |
|---|---|---|---|---|
| 10,637,665 | B1 * | 4/2020 | Sundaresan ........... | H04L 63/083 |
| 10,791,459 | B1 * | 9/2020 | Hu ........................ | H04W 8/245 |
| 10,798,564 | B2 * | 10/2020 | Namiranian .......... | H04W 8/205 |
| 10,959,087 | B1 * | 3/2021 | Chen ..................... | H04W 8/205 |
| 10,966,080 | B1 * | 3/2021 | Chen ..................... | H04W 8/183 |

(Continued)

FOREIGN PATENT DOCUMENTS

| | | | | |
|---|---|---|---|---|
| EP | 3644631 A1 * | 4/2020 | ......... | H04L 63/0807 |
| WO | WO-2019099178 A1 * | 5/2019 | ............. | H04L 63/08 |

(Continued)

*Primary Examiner* — Kambiz Zand

(57) ABSTRACT

A telecommunication includes a computing device and a mobile device. The computing device is in communication with a blockchain network, a subscription manager data preparation (SM-DP) platform, and the mobile device. The computing device is configured to perform a first set of operations. The first set of operations includes retrieving an identity token from the blockchain network. The identity token is a first non-fungible token uniquely identifying a user of the mobile device. The first set of operations further includes retrieving, from the SM-DP platform, an embedded subscriber identity module (eSIM) profile for the identity token from the blockchain network. The first set of operations further includes generating, via the blockchain network, a second non-fungible token. The second non-fungible token includes the eSIM profile. The mobile device is in communication with the blockchain network.

14 Claims, 7 Drawing Sheets

(56) References Cited

U.S. PATENT DOCUMENTS

| | | | |
|---|---|---|---|
| 11,503,456 B1 * | 11/2022 | Chen ..................... | H04W 8/183 |
| 2017/0104750 A1 * | 4/2017 | Li ......................... | H04W 12/35 |
| 2019/0097802 A1 * | 3/2019 | Rowe ................... | H04L 9/3213 |
| 2020/0112854 A1 * | 4/2020 | Namiranian ...... | H04M 1/72445 |
| 2020/0220791 A1 * | 7/2020 | Aiello .................. | H04L 41/069 |
| 2020/0259656 A1 * | 8/2020 | Sundaresan ...... | G06Q 20/40145 |
| 2020/0267521 A1 * | 8/2020 | Bruner ................... | H04W 4/50 |
| 2021/0067342 A1 * | 3/2021 | Guinard ............... | H04L 9/0866 |
| 2022/0021728 A1 * | 1/2022 | Kelly ..................... | H04L 67/06 |
| 2022/0129581 A1 * | 4/2022 | Jones ................... | G06F 16/901 |
| 2023/0010440 A1 * | 1/2023 | Tait ...................... | H04W 12/06 |

FOREIGN PATENT DOCUMENTS

| | | | | |
|---|---|---|---|---|
| WO | WO-2021084219 A1 * | 5/2021 | ......... | H04L 63/0876 |
| WO | WO-2022208138 A1 * | 10/2022 | ............ | H04W 12/06 |

* cited by examiner

300

400

Begin

Establish a connection with blockchain network ~ 402

Access a non-fungible token stored on blockchain ledger ~ 404

Unpack the non-fungible token ~ 406

Store the eSIM profile on eSIM chip ~ 408

Establish a connection with mobile network operator ~ 410

End

EMBEDDED SUBSCRIBER IDENTITY MODULE NON-FUNGIBLE TOKEN SYSTEM

CROSS-REFERENCE TO RELATED APPLICATIONS

This application claims priority to U.S. Provisional Application Ser. No. 63/202,259, filed Jun. 3, 2021, which is hereby incorporated by reference in its entirety.

FIELD OF THE DISCLOSURE

Embodiments disclosed herein generally relate to a telecommunication system, and more particularly to an embedded subscriber identity module non-fungible token system.

BACKGROUND

Subscriber identity module (SIM) cards play an integral role in mobile telecommunication systems. Over the years, SIM cards have gone from physical devices that are inserted into a mobile device when initializing a mobile device with a carrier's network to embedded SIM chips that are hard-coded within the mobile device.

SUMMARY

In some embodiments, a telecommunication system is disclosed herein. The telecommunication system includes a computing device and a mobile device. The computing device is in communication with a blockchain network, a subscription manager data preparation (SM-DP) platform, and the mobile device. The computing device is configured to perform a first set of operations. The first set of operations includes retrieving an identity token from the blockchain network. The identity token is a first non-fungible token uniquely identifying a user of the mobile device. The first set of operations further includes retrieving, from the SM-DP platform, an embedded subscriber identity module (eSIM) profile for the given identity token from the blockchain network. The first set of operations further includes generating, via the blockchain network, a second non-fungible token. The second non-fungible token includes the eSIM profile. The mobile device is in communication with the blockchain network. The mobile device is configured to perform a second set of operations. The second set of operations includes downloading, from the blockchain network, the second non-fungible token. The second set of operations further include unpacking the eSIM profile from the second non-fungible token. The second set of operations further include installing the eSIM profile on an eSIM chip associated with the mobile device.

In some embodiments, a method is disclosed herein. The computing device retrieves an identity token from a blockchain network. The identity token can be a first non-fungible token uniquely identifying a user of a mobile device to be registered with a mobile network operator. The computing device retrieves, from a subscription manager data preparation (SM-DP) platform associated with the mobile network operator, an embedded subscriber identity module (eSIM) profile for the given identity token from the blockchain network. The computing device generates, via the blockchain network, a second non-fungible token. The second non-fungible token can include the eSIM profile. The computing device causes the mobile device to be registered with the mobile network operator using the second non-fungible token.

In some embodiments, a non-transitory computer readable medium is disclosed herein. The non-transitory computer readable medium includes instructions which, when executed by a computing system, cause the computing system to perform operations. The operations include retrieving, by the computing system, an identity token from a blockchain network. The identity token is a first non-fungible token uniquely identifying a user of a mobile device to be registered with a mobile network operator. The operations further include retrieving, by the computing system from a subscription manager data preparation (SM-DP) platform associated with the mobile network operator, an embedded subscriber identity module (eSIM) profile for the given identity token from the blockchain network. The operations further include generating, by the computing system via the blockchain network, a second non-fungible token. The second non-fungible token includes the eSIM profile. The operations further include causing, by the computing system, the mobile device to be registered with the mobile network operator using the second non-fungible token.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Conventionally, owners of mobile devices would be required to physically insert a SIM card into a SIM card slot of the mobile device. The SIM card allows the owner of the mobile device to access functionality of a mobile provider's network. As technology has improved, the conventional SIM card has been replaced by an embedded SIM (eSIM) chip that is embedded directly into the mobile device. To gain access to a mobile provider's network using an eSIM chip, users would need to download an eSIM profile from a mobile network operator and install the eSIM profile on a slot of the eSIM chip. While such a process is more efficient than the swapping out or installing of physical devices SIM cards, it is especially prone to fraudulent individuals either intercepting the eSIM profile or spoofing the mobile owner's identity so that the fraudulent individual can download the user's eSIM profile.

One or more techniques described herein improves upon the eSIM process by providing a mechanism through which a mobile owner can gain access to an eSIM profile via a non-fungible token.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

Figure 1:
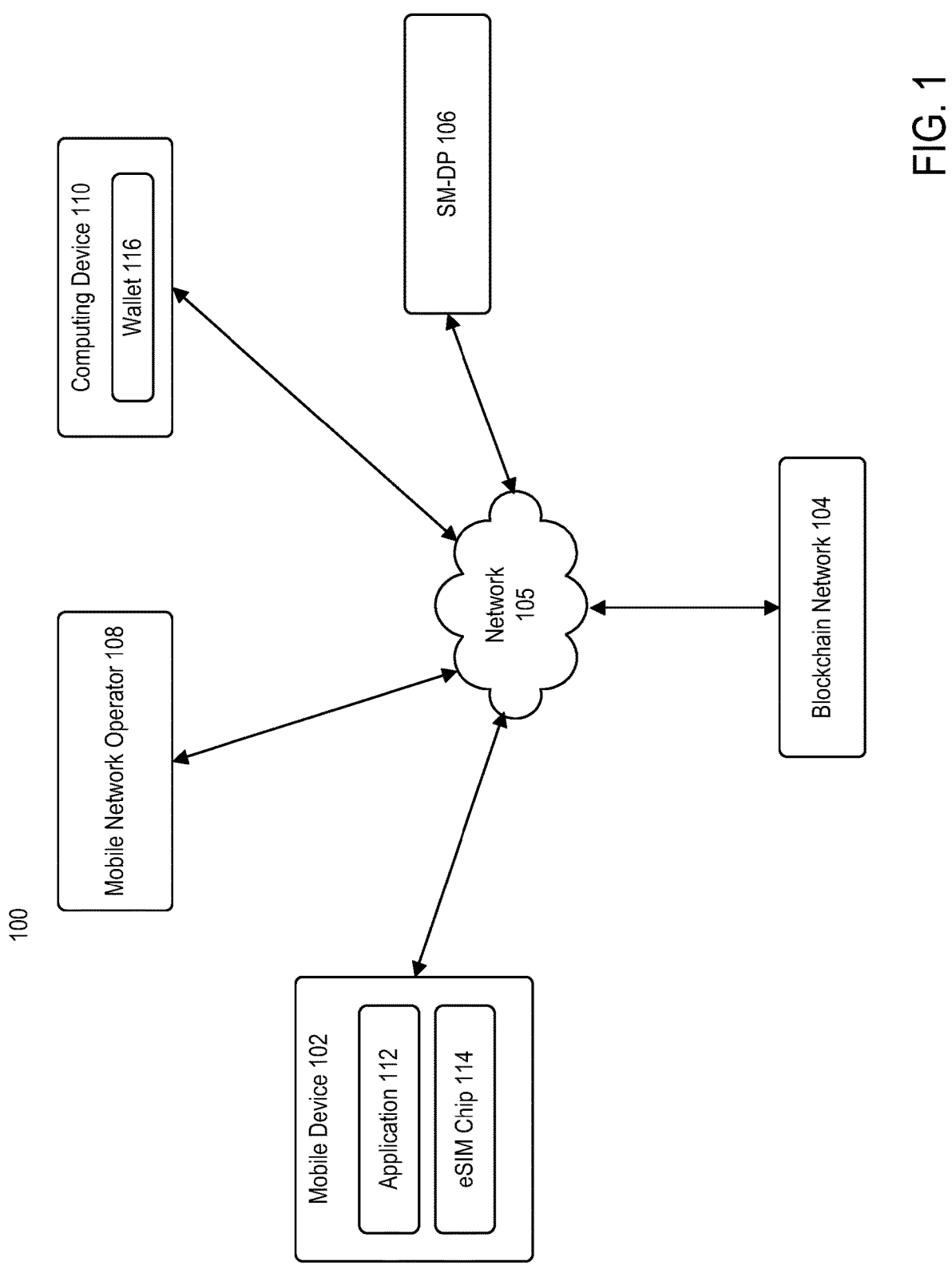
FIG. 1 is a block diagram illustrating a computing environment, according to example embodiments.

FIG. 1 is a block diagram illustrating a computing environment 100, according to one embodiment. Computing environment 100 may include at least one or more mobile devices 102, blockchain network 104, a subscription manager data preparation (SM-DP) 106, a mobile network operator 108, and a computing device 110 communicating via network 105.

Network 105 may be representative of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, Zig-Bee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may be representative of the Internet, a private data network, virtual private network using a public network and/or other suitable connection(s) that enables components in computing environment 100 to send and receiving information between the components of computing environment 100.

Mobile device 102 may be operated by a user. Mobile device 102 may belong to or be provided to a customer or may be borrowed, rented, or shared. Customers may include individuals such as, for example, subscribers or customers of an entity associated with mobile network operator 108, such as individuals who have obtained the mobile device and/or a mobile plan from an entity associated with mobile network operator 108.

Mobile device 102 may include application 112 and embedded subscriber identity module (eSIM) 114. Application 112 may be representative of a web browser that allows access to a website or a stand-alone application. Mobile device 102 may access application 112 to access functionality of blockchain network 104. For example, mobile device 102 may communicate over network 105 to request a non-fungible token, for example, from blockchain network 104. In some embodiments, application 112 may be representative of a software development kit associated with a custom read-only memory operating system. For example, application 112 may be representative of a software development kit for a custom Android read-only memory stored and executed on mobile device 102.

Application 112 may communicate with blockchain network 104 to download a non-fungible token with an eSIM profile to mobile device 102. In some embodiments, such communication may be facilitated through one or more application programming interfaces (APIs) linking application 112 to functionality of blockchain network 104. Application 112 may then unpack the eSIM profile from the non-fungible token and store the eSIM profile on eSIM chip 114. The eSIM profile may represent the phone number to be associated with mobile device 102. The eSIM profile non-fungible token may be used for various authentication processes rather than relying solely on the phone number.

eSIM chip 114 may be representative of a programmable SIM card or chip that is directly embedded in mobile device 102. Rather than require a user of mobile device 102 to install a physical SIM card when a user registers mobile device 102 with mobile network operator 108 or rather than require a user of mobile device 102 to swap out physical SIM cards when a user changes mobile network operators (e.g., SIM card #1 works with mobile network operator #1 and SIM card #2 works with mobile network operator #2), eSIM chip 114 may allow a user to register with mobile network operator 108 or change mobile network operators without requiring the user to physically install a SIM card. In other words, eSIM chip 114 may allow for remote SIM provisioning.

Mobile network operator 108 may be representative of a provider of wireless communication services to mobile device 102. In order for mobile network operator 108 to provide services to mobile device 102, mobile device 102 may obtain a physical SIM card or eSIM profile that is associated with mobile network operator 108. Data associated with the eSIM profile enables mobile device 102 to take advantage of the services provided by mobile network operator 108.

Computing device 110 may be representative of a computing system associated with mobile network operator 108. Computing device 110 may be configured to perform various operators to facilitate remote SIM provisioning for mobile device 102. Computing device 110 may include wallet 116. Wallet 116 may be representative of digital wallet that allows computing device 110 to store and manage their cryptocurrency and/or digital assets. For example, wallet 116 may be representative of a storage location on computing device 110 for storing one or more non-fungible tokens associated with subscribers to mobile network operator 108.

In some embodiments, computing device 110 may be configured to establish one or more identity tokens for subscribers to mobile network operator 108. The identity token may be a non-fungible token that uniquely identifies a user of mobile device 102. The identity token may be stored on a blockchain ledger associated with blockchain network 104. To generate the identity token, computing device 110 may access functionality of blockchain network 104. Via blockchain network 104, computing device 110 may generate or "mint" a non-fungible token corresponding to a user of mobile device 102. In some embodiments, the non-fungible token may include, as metadata, information associated with the user of mobile device 102. Once generated, the identity token may be stored on a blockchain ledger associated with blockchain network 104.

In some embodiments, once the identity token is generated and stored on the blockchain ledger, computing device 110 may utilize the identity token to verify the identity of mobile device 102 to SM-DP 106. The verification process may result in SM-DP 106 providing computing device 110 with an eSIM profile to be provided to mobile device 102. Responsive to receiving the eSIM profile, computing device 110 may generate a non-fungible token with the eSIM profile as metadata. For example, computing device 110 may communicate or access blockchain network 104 to generate or mint a non-fungible token having the eSIM profile as metadata. Once generated, mobile device 102 may fetch the non-fungible token with the eSIM profile from blockchain network 104.

In some embodiments, the identity token may be propagated to blockchain network 104 in the form of a directed acyclic graph. Interactions with each self-sovereign identity, or identity token, on blockchain network 104 may be propagated into relationships on the acyclic graphic, with each identity token representing an identity on the directed graph. In some embodiments, the identities may include individuals or entities.

An entity in the directed graph can represent a broad range of non-individual participants, including but not limited to businesses, devices, arbitrary applications, and the like. Relationships between individuals and/or entities may be established on a selective disclosure matrix that is in accordance with a non-fungible token relationship contract framework. In some embodiments, the identity token may be configured a manner such that various types of disclosures and/or properties can be incorporated into the body of the identity token with a reference locator to a decentralized storage solution. By incorporating such information into the body of the identity token, the identity token can be used for additional functionality. For example, the types of disclosures/properties that can be incorporated into the body of an identity token with a reference locator to a decentralized storage solution may fall under one of the following categories:

Attestation: third party attestation to verify a claim about the individual entity's identification records.

Attribution: properties of an individual/entity that are self-issued/permissioned by the user and verified by the user, along with establishing a relationship with another entity or individual.

Accreditation: institutions and organizations may be allowed to create verified records of a claim that they need frequent disclosures.

Augmentation: the ability to create a session or authenticate an individual or entity without being at the location.

Aliasing: creating secondary identities that may be related to arbitrary applications.

Assimilation: open source and web3 capable tools that may allow applications to easily adopt and help propagate.

Aggregation: while preserving personal identification information, the ability for third parties to mine metadata (Incentivized) about individuals and entities for demographic data analysis.

Authentication: ability to authenticate an individual/entity into a system with varying degrees/factors of authentication.

Accessibility: ability for third parties to write accessibility applications for unique scenarios and edge cases.

Admissibility: using the identity non-fungible token to gain admission to an event after verifying more attributes.

Assertion: ability for entities/organizations to create a claim on an individual/entity, permissionless.

Appendable: ability to modify both permissioned and non-permissioned processes with either a m/n signatures and/or a pre-existing contract framework. For example, if someone ends up in a correctional facility, another person may be needed to help manage their identity and attributes.

In some embodiments, relationships between identity tokens, individuals, or entities may be managed by a decentralized framework for establishing web3.0 relationships using non-fungible tokens as unique identifiers. In some embodiments, relationship contracts may have plug and play disclosure requirements to create a unique relationship between two identity tokens. In some embodiments, all relevant interactions between the two non-fungible tokens, from the point of establishment of a relationship between the two non-fungible tokens, may propagate into their own subgraph. From an implementation perspective, the subgraph may be a derivative non-fungible token of the two or more entities that fit into a directed identity graph (DIG) relationship framework. In some embodiments, an economic system incentivizing interactions, joining the validator set and reliable attestation service providers can be established on the directed identity graph.

Blockchain network 104 may be representative of a network configured to provide blockchain services to computing device 110 and/or mobile network operator 108. Blockchain network 104 may be configured to support the creation or minting of non-fungible tokens. Generally, blockchain network 104 may include a blockchain ledger associated therewith. In some embodiments, the blockchain ledger may be configured to store non-fungible tokens generated within blockchain network 104. In some embodiments, the blockchain ledger may be a public ledger. In some embodiments, the blockchain ledger may be a private ledger uniquely associated with members of mobile network operator 108 and/or computing device 110.

Figure 2:
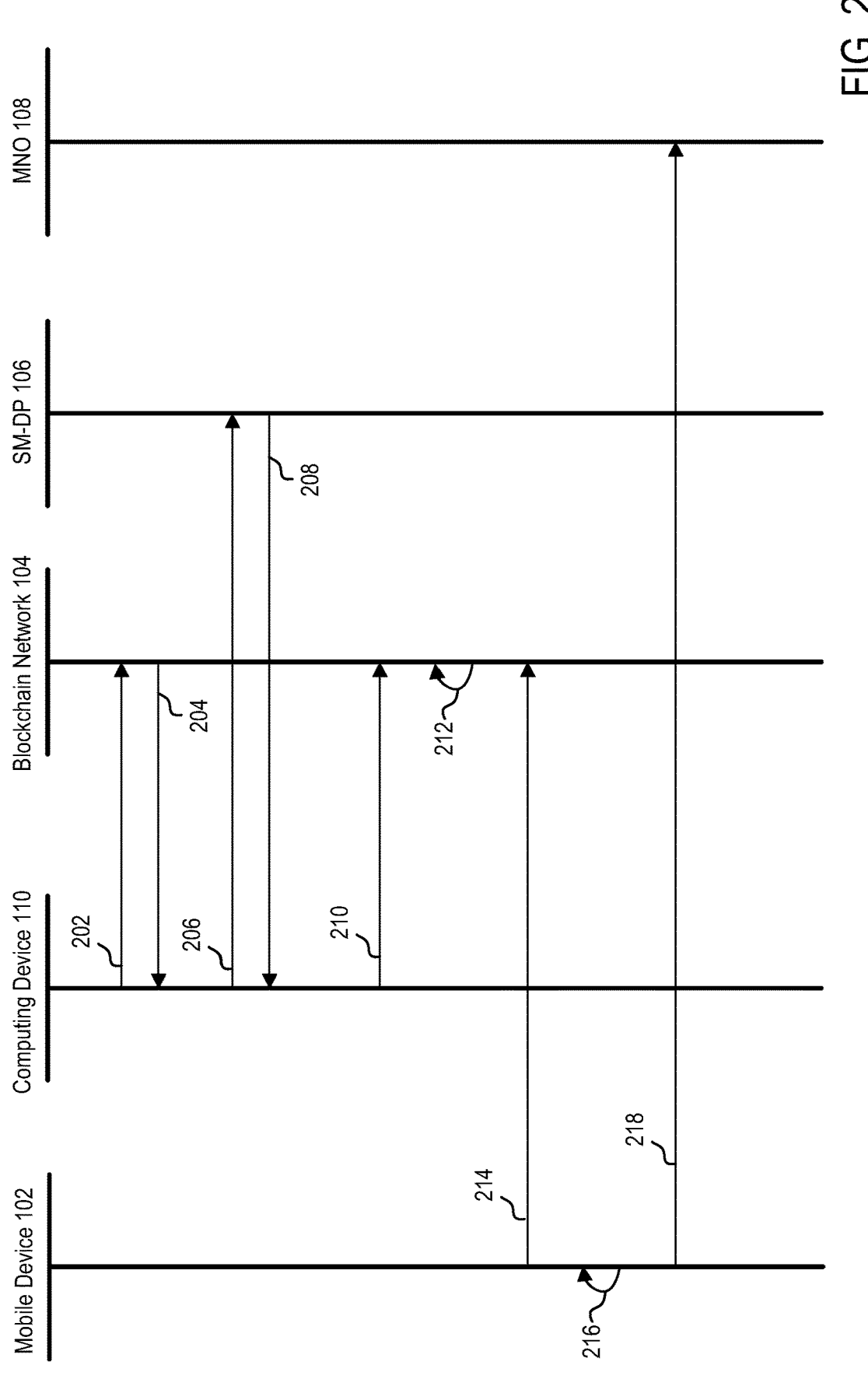
FIG. 2 is a block diagram illustrating communication within the computing environment of FIG. 1, according to example embodiments.

FIG. 2 is a block diagram illustrating communication among components of computing environment 100, according to example embodiments. The operations described in FIG. 2 may be associated with a process of registering mobile device 102 with a carrier's services (e.g., registering with mobile network operator 108), according to example embodiments.

At block 202, computing device 110 may submit a request to blockchain network 104 to create an identity token. The identity token may be a non-fungible token that uniquely identifies a user of mobile device 102. The identity token may be used to represent the user of mobile device 102 and as a security proof of verification in downstream processes. The identity token may not be replicated and may not be mutually interchangeable.

At block 204, blockchain network 104 may receive the request from computing device 110. Upon receiving the request, blockchain network 104 may generate the identity token for a user of mobile device 102. Blockchain network 104 may further store the identity token on a blockchain ledger associated with blockchain network 104. Blockchain network 104 may then provide the identity token to computing device 110 for storage in wallet 116.

At block 206, computing device 110 may request an eSIM profile from SM-DP 106. The request may include the identity token that uniquely identifies the user of mobile device 102. In some embodiments, rather than computing device 110 requesting the eSIM profile from SM-DP 106, SM-DP 106 may periodically poll computing device 110 to determine when new identity tokens have been generated or minted.

At block 208, SM-DP 106 may receive and verify the identity token from mobile device 102. In some embodiments, SM-DP 106 may perform a zero knowledge proof to verify the identity token. If SM-DP 106 verifies the identity token, the SM-DP 106 may transmit an eSIM profile to computing device 110 for further processing. The eSIM profile may enable mobile device 102 to take advantage of the services provided by mobile network operator 108.

At block 210, computing device 110 may submit a request to blockchain network 104 to generate a non-fungible token based on the eSIM profile. For example, computing device 110 may access blockchain network 104 to generate or mint a second non-fungible token with the eSIM profile as metadata. In this manner, when a device unpacks the non-fungible token, the device may have access to the eSIM profile.

At block 212, blockchain network 104 may receive the request from computing device 110. Upon receiving the request, blockchain network 104 may generate the second non-fungible token with the eSIM profile as metadata. Blockchain network 104 may further store the second non-fungible token on a blockchain ledger associated with blockchain network 104. Blockchain network 104 may optionally then provide the second non-fungible token to computing device 110 for storage in wallet 116.

At block 214, mobile device 102 may fetch or retrieve the second non-fungible token from blockchain network 104. For example, application 112 may be configured to interact with blockchain network 104 such that, when the second non-fungible token is generated and stored on a blockchain ledger, application 112 may download the second non-fungible token from blockchain network 104. In some embodiments, mobile device 102 may fetch or retrieve the second non-fungible token from blockchain network 104 when prompted by the user of mobile device 102. For example, the user of mobile device 102 may prompt mobile device 102 to fetch or retrieve the second non-fungible token when setting up a subscription number on mobile device 102. In some embodiments, mobile device 102 may communicate with blockchain network 104 via one or more APIs linking application 112 to functionality of blockchain network 104.

In some embodiments, when mobile device 102 fetches or retrieves the second non-fungible token from blockchain network 104, mobile device 102 may use an identifier or ID that computing device 110 returned to the user when the second non-fungible token was generated. In some embodiments, when mobile device 102 fetches or retrieves the second non-fungible token from blockchain network 104, mobile device 102 may providing blockchain network 104 with an identifier or ID associated with the user's identity token. In this manner, blockchain network 104 may know which token to provide to mobile device 102.

At block 216, upon downloading the second non-fungible token, application 112 may unpack the eSIM profile from the second non-fungible token. Once the eSIM profile is unpacked, application 112 may store the eSIM profile on eSIM chip 114. In this manner, mobile device 102 may work directly with blockchain network 104 to download the second non-fungible token and extract the eSIM profile instead of directly communicating with SM-DP 106 and/or mobile network operator 108.

At block 218, upon storing the eSIM profile on eSIM chip 114, mobile device 102 may connect to mobile network operator 108. In this manner, mobile device 102 may be granted access to services provided by mobile network operator 108.

Figure 3:
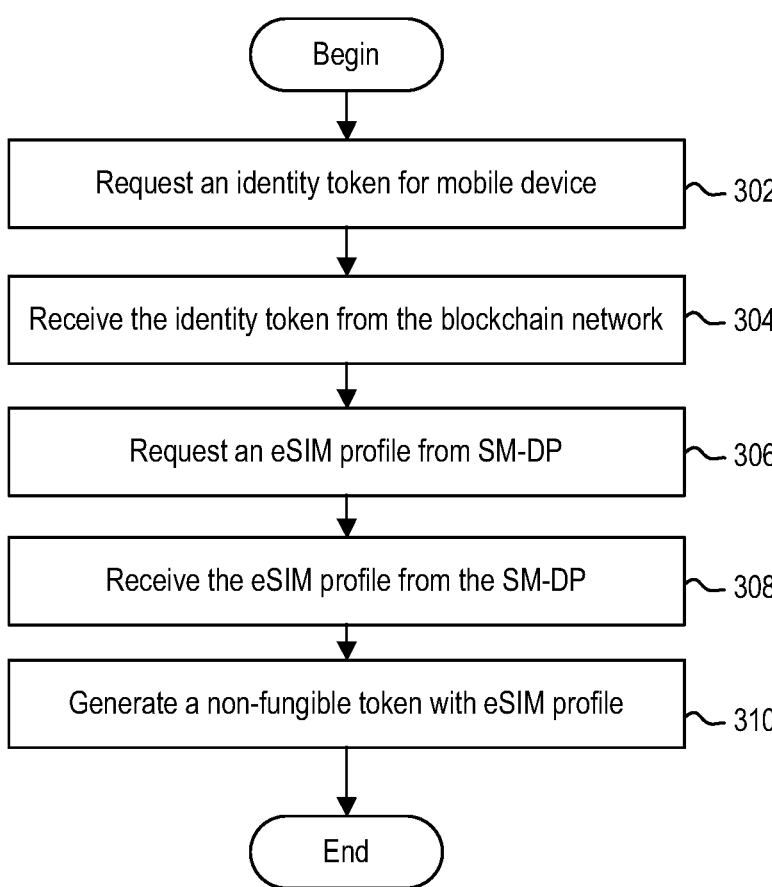
FIG. 3 is a flow diagram illustrating a telecommunications method, according to example embodiments.

FIG. 3 is a flow diagram illustrating a telecommunications method 300, according to example embodiments. Method 300 may begin at step 302.

At step 302, computing device 110 may request an identity token for a user of mobile device 102. In some embodiments, requesting an identity token for the user of mobile device 102 may include initiating generation of the identity token for the user of mobile device 102. For example, computing device 110 may submit a request to blockchain network 104 to create an identity token. The identity token may be a non-fungible token that uniquely identifies a user of mobile device 102. The identity token may be used to represent the user of mobile device 102 and as a security proof of verification in downstream processes.

In some embodiments, the identity token may already be generated and stored on a blockchain ledger for a user of mobile device 102. For example, a user of mobile device 102 may be switching mobile device carriers. In another example, a user of mobile device 102 may be a pre-existing customer and is setting up a new device (e.g., mobile device 102) with a mobile device carrier. In such embodiments, computing device 110 may simply request the identity token from blockchain network 104. For example, computing device 110 may provide blockchain network 104 may an identifier or ID associated with the identity token.

At step 304, computing device 110 may receive the identity token from blockchain network 104. For example, responsive to blockchain network 104 receiving the request from computing device 110, blockchain network 104 may provide the requested identity token to wallet 116 of computing device 110.

At step 306, computing device 110 may request an eSIM profile from SM-DP 106. For example, responsive to receiving the identity token, computing device 110 may request an eSIM profile from SM-DP 106 using the received identity token. SM-DP 106 may verify the identity token from mobile device 102. For example, SM-DP 106 may perform a zero knowledge proof to verify the identity token.

At block 308, computing device 110 may receive the eSIM profile from SM-DP 106. For example, responsive to SM-DP 106 verifying the identity token, the SM-DP 106 may transmit an eSIM profile to computing device 110 for further processing. The eSIM profile may enable mobile device 102 to take advantage of the services provided by mobile network operator 108.

At block 310, computing device 110 may generate a non-fungible token with the eSIM profile. For example, computing device 110 may access blockchain network 104 to generate or mint a non-fungible token with the eSIM profile as metadata. In this manner, when a device unpacks the non-fungible token, the device may have access to the eSIM profile. Blockchain network 104 may store the non-fungible token on a blockchain ledger associated with blockchain network 104.

Figure 4:
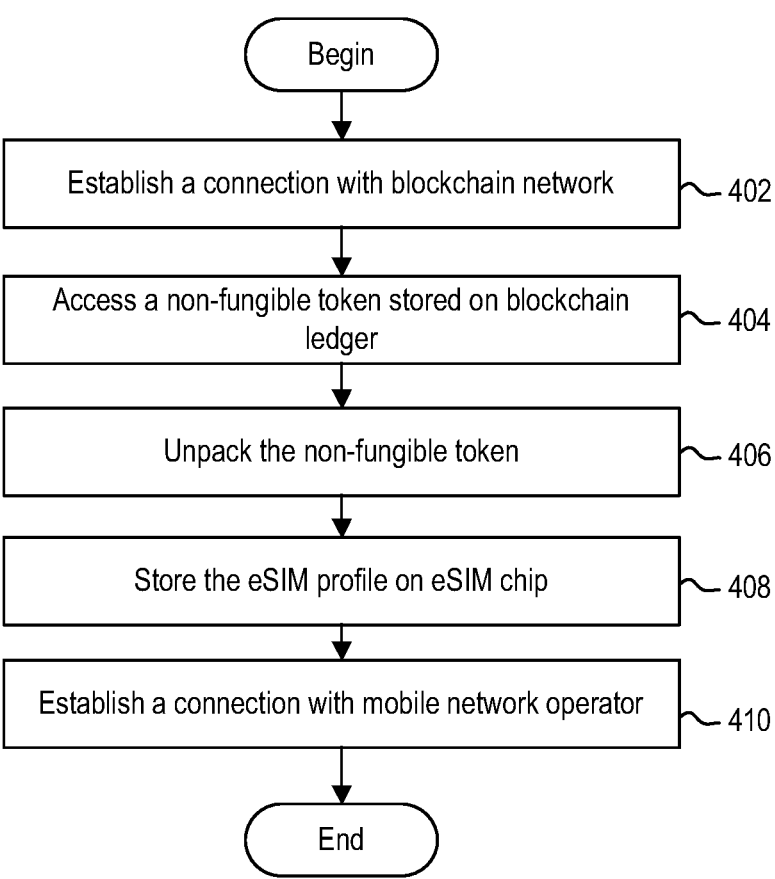
FIG. 4 is a flow diagram illustrating a method of registering mobile device with mobile network operator, according to example embodiments.

FIG. 4 is a flow diagram illustrating a method 400 of registering mobile device 102 with mobile network operator 108, according to example embodiments. Method 400 may begin at step 402.

At step 402, mobile device 102 may establish a connection with blockchain network 104. For example, application 112 executing on mobile device 102 may establish a connection with blockchain network 104. In some embodiments, the connection may be established via one or more APIs linking mobile device 102 to functionality of blockchain network 104.

At step 404, mobile device 102 may access a non-fungible token stored on a blockchain ledger associated with blockchain network 104. For example, once the connection is established between mobile device 102 and blockchain network 104 via application 112, application 112 may download the non-fungible token from blockchain network 104. In some embodiments, mobile device 102 may download the non-fungible token via one or more APIs linking application 112 to functionality of blockchain network 104.

At step 406, mobile device 102 may unpack the non-fungible token to extract the eSIM profile. For example, upon receiving the non-fungible token from blockchain network 104, application 112 may unpack the non-fungible token to access the eSIM profile, which was stored as metadata in the non-fungible token.

At step 408, mobile device 102 may store the eSIM profile on eSIM chip 114. For example, application 112 may store the eSIM profile in an open slot of eSIM chip 114. In this manner, mobile device 102 may work directly with blockchain network 104 to download the non-fungible token and extract the eSIM profile instead of directly communicating with SM-DP 106 and/or mobile network operator 108.

In some embodiments, method 400 may include step 410. At step 410, mobile device 102 may establish a connection with mobile network operator 108. Once established, mobile device 102 may be able to access functionality of a mobile network associated with mobile network operator 108.

Figure 5A:
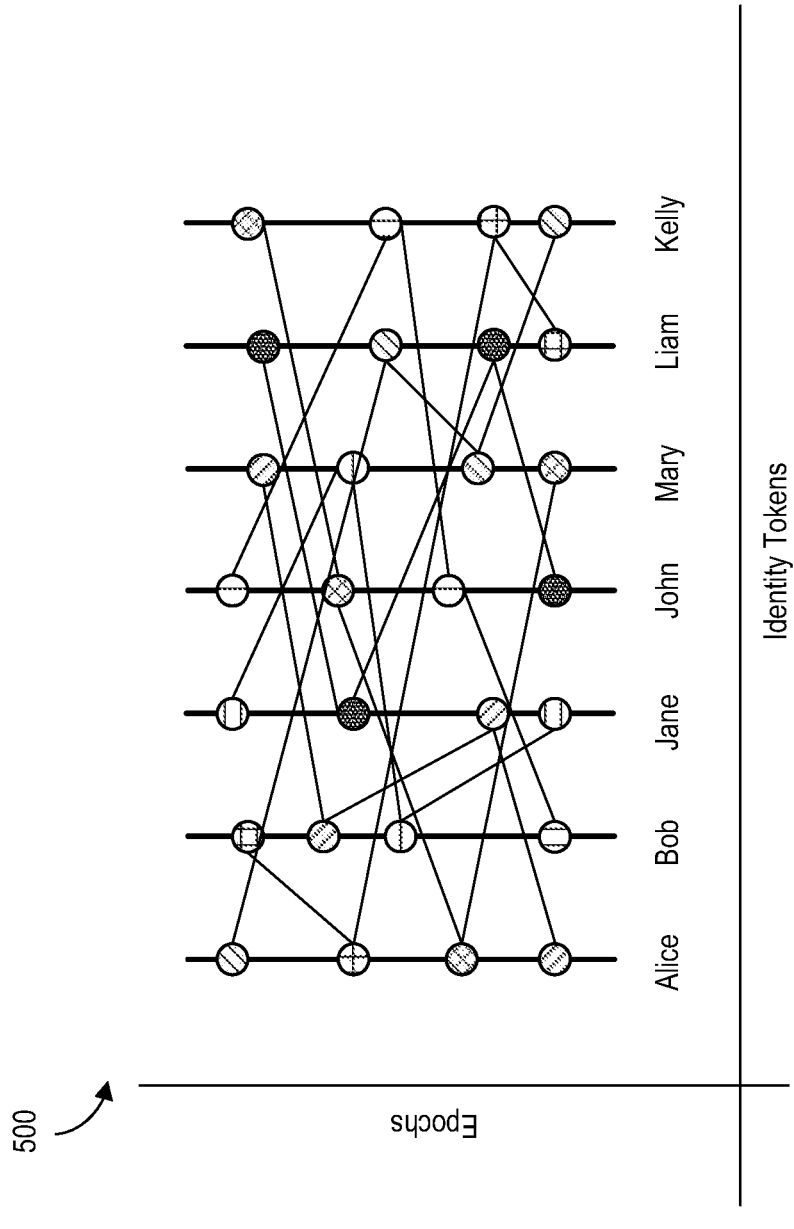
FIG. 5A is a block diagram illustrating an identity graph, according to example embodiments.

FIG. 5A is a block diagram illustrating an identity graph 500, according to example embodiments. As shown, identity graph 500 may illustrate identity tokens along the x-axis and epochs across the y-axis. Identity graph 500 may illustrate various relationships or interactions between identity tokens.

Figure 5B:
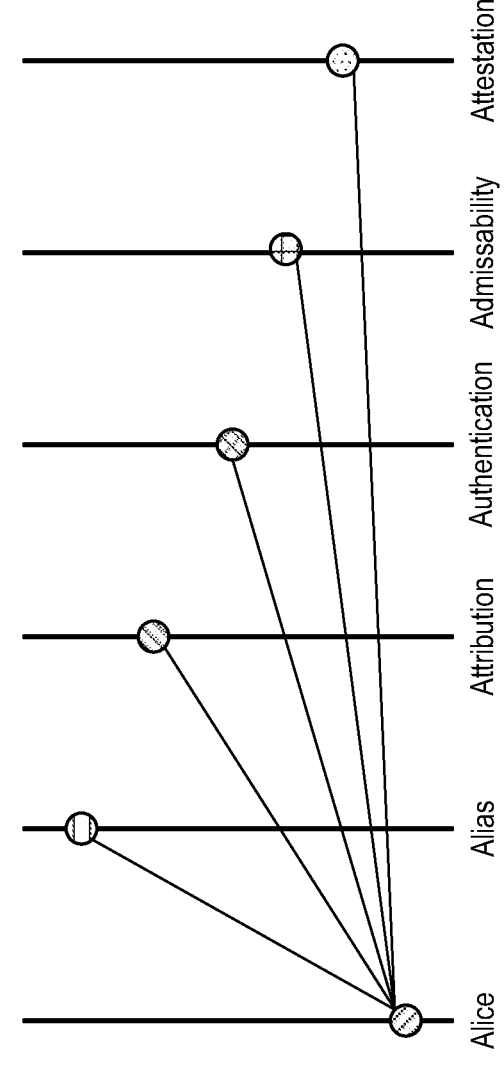
FIG. 5B is a block diagram illustrating an individual identity graph, according to example embodiments.

FIG. 5B is a block diagram illustrating an individual identity graph 550, according to example embodiments. As shown, individual identity graph 550 may correspond to Alice's individual identity graph. Each node on individual identity graph 550 may indicate exemplary uses of the individual identity token, such as, but not limited to alias (e.g., a gamer tag), attribution (e.g., a trusted device), authentication (e.g., dynamic authentication), admissibility (e.g., concert tickets), and attestation (e.g., verified claim— know your customer).

Figures 6A, 6B:
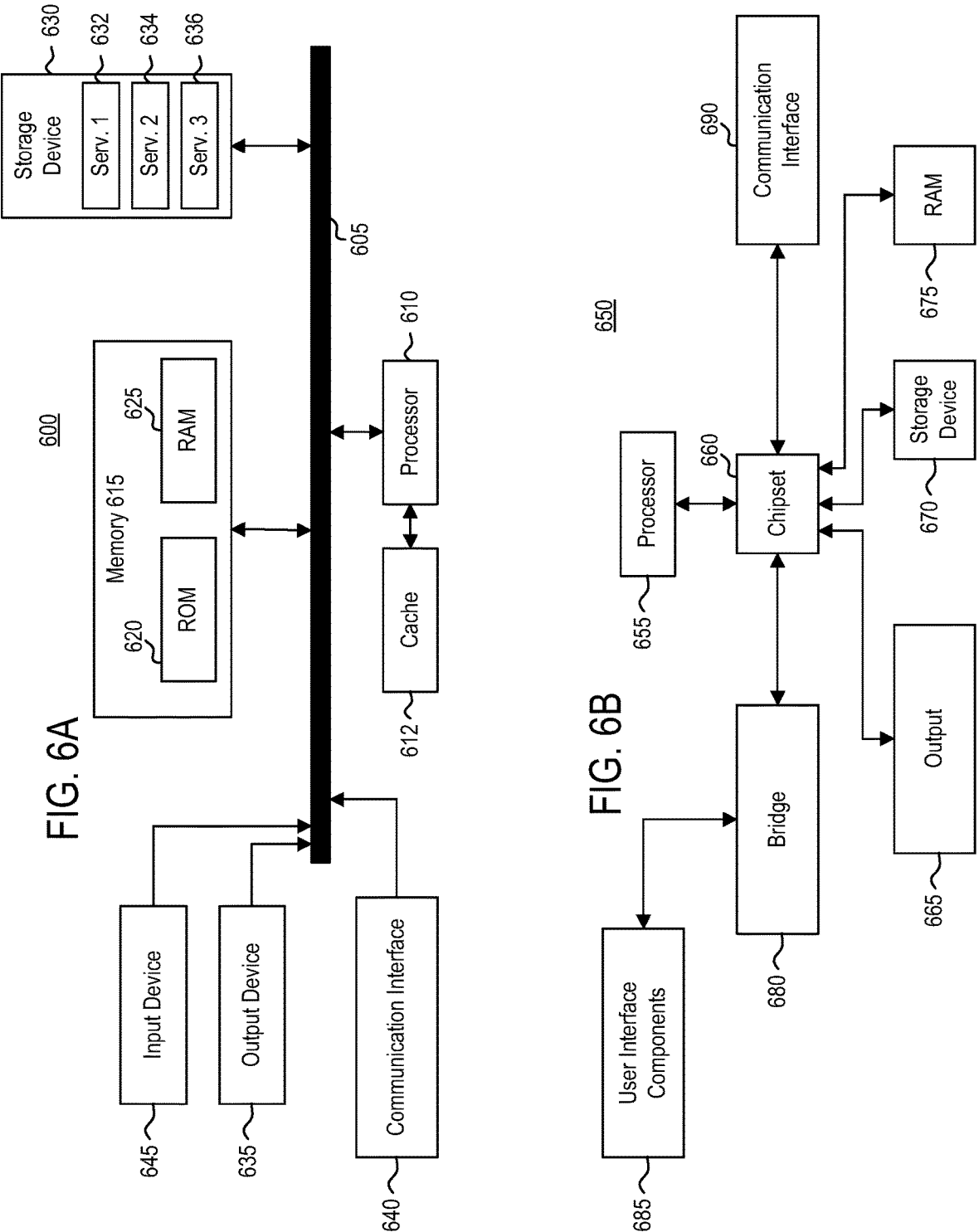
FIG. 6A illustrates a system bus computing system architecture, according to example embodiments.
FIG. 6B illustrates a computer system having a chipset architecture, according to example embodiments.

FIG. 6A illustrates an architecture of system bus computing system 600, according to example embodiments. One or more components of system 600 may be in electrical communication with each other using a bus 605. System 600 may include a processor (e.g., one or more CPUs, GPUs or other types of processors) 610 and a system bus 605 that couples various system components including the system memory 615, such as read only memory (ROM) 620 and random access memory (RAM) 625, to processor 610. System 600 can include a cache of high-speed memory connected directly with, in close proximity to, or integrated as part of processor 610. System 600 can copy data from memory 615 and/or storage device 630 to cache 612 for quick access by processor 610. In this way, cache 612 may provide a performance boost that avoids processor 610 delays while waiting for data. These and other modules can control or be configured to control processor 610 to perform various actions. Other system memory 615 may be available for use as well. Memory 615 may include multiple different types of memory with different performance characteristics. Processor 610 may be representative of a single processor or multiple processors. Processor 610 can include one or more of a general purpose processor or a hardware module or software module, such as service 1 632, service 2 634, and service 6 636 stored in storage device 630, configured to control processor 610, as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction with the system 600, an input device 645 which can be any number of input mechanisms, such as a microphone for speech, a touch-sensitive screen for gesture or graphical input, keyboard, mouse, motion input, speech and so forth. An output device 635 (e.g., a display) can also be one or more of a number of output mechanisms known to those of skill in the art. In some instances, multimodal systems can enable a user to provide multiple types of input to communicate with system 600. Communications interface 640 can generally govern and manage the user input and system output. There is no restriction on operating on any particular hardware arrangement and therefore the basic features here may easily be substituted for improved hardware or firmware arrangements as they are developed.

Storage device 630 may be a non-volatile memory and can be a hard disk or other types of computer readable media that can store data that are accessible by a computer, such as magnetic cassettes, flash memory cards, solid state memory devices, digital versatile disks, cartridges, random access memories (RAMs) 625, read only memory (ROM) 620, and hybrids thereof.

Storage device 630 can include services 632, 634, and 636 for controlling the processor 610. Other hardware or software modules are contemplated. Storage device 630 can be connected to system bus 605. In one aspect, a hardware module that performs a particular function can include the software component stored in a computer-readable medium in connection with the necessary hardware components, such as processor 610, bus 605, output device 635 (e.g., a display), and so forth, to carry out the function.

FIG. 6B illustrates a computer system 650 having a chipset architecture, according to example embodiments. Computer system 650 may be an example of computer hardware, software, and firmware that can be used to implement the disclosed technology. System 650 can include one or more processors 655, representative of any number of physically and/or logically distinct resources capable of executing software, firmware, and hardware configured to perform identified computations. One or more processors 655 can communicate with a chipset 660 that can control input to and output from one or more processors 655. In this example, chipset 660 outputs information to output 665, such as a display, and can read and write information to storage device 670, which can include magnetic media, and solid-state media, for example. Chipset 660 can also read data from and write data to storage device 675 (e.g., RAM). A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by one or more processors 655 analyzing data stored in storage device 670 or 675. Further, the machine can receive inputs from a user through user interface components 685 and execute appropriate functions, such as browsing functions by interpreting these inputs using one or more processors 655.

It can be appreciated that example systems 600 and 650 can have more than one processor 610 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A telecommunication system, comprising:
a computing device associated with a mobile network operator, the computing device in communication with a blockchain network, a subscription manager data preparation (SM-DP) platform, and a mobile device, wherein the computing device is configured to perform a first set of operations, comprising:
retrieving an identity token from the blockchain network, wherein the identity token is a first non-fungible token uniquely identifying a user of the mobile device;
authenticating the user of the mobile device with the SM-DP platform using the identity token;
retrieving, from the SM-DP platform, an embedded subscriber identity module (eSIM) profile responsive to the user of the mobile device being authenticated with the SM-DP platform using the identity token, the identity token facilitating access to the eSIM profile; and
responsive to retrieving the eSIM profile from the SM-DP platform, generating, via the blockchain network, a second non-fungible token, wherein the second non-fungible token comprises the eSIM profile, wherein the eSIM profile is associated with the mobile network operator providing network services for the mobile device, the second non-fungible token providing the mobile device with access to the eSIM profile; and
the mobile device in communication with the blockchain network, wherein the mobile device is configured to perform a second set of operations, comprising:
requesting, from the blockchain network, the second non-fungible token using the identity token;
downloading, from the blockchain network, the second non-fungible token;
unpacking the eSIM profile from the second non-fungible token; and
installing the eSIM profile on an eSIM chip associated with the mobile device.

2. The telecommunication system of claim 1, wherein the second set of operations further comprises:
establishing a connection with a mobile network provider using the eSIM profile stored on the eSIM chip.

3. The telecommunication system of claim 2, wherein the second set of operations further comprises:
downloading a mobile subscription to a network associated with the mobile network provider from the mobile network provider.

4. The telecommunication system of claim 1, wherein the first set of operations further comprises:
storing the second non-fungible token on a blockchain ledger associated with the blockchain network.

5. The telecommunication system of claim 1, wherein retrieving an identity token from the blockchain network comprises:
downloading the identity token to a wallet associated with the computing device.

6. The telecommunication system of claim 1, wherein the mobile device comprises a software development kit for a read-only memory stored and executed on the mobile device.

7. The telecommunication system of claim 6, wherein the software development kit comprises one or more application programming interfaces (APIs) linking the mobile device to the blockchain network.

8. The telecommunication system of claim 1, wherein the eSIM profile represents a phone number associated with the mobile device.

9. A method comprising:
retrieving, by a computing device associated with a mobile network operator, an identity token from a blockchain network, wherein the identity token is a first non-fungible token uniquely identifying a user of a mobile device to be registered with the mobile network operator;
authenticating, by the computing device, the user of the mobile device with a subscription manager data preparation (SM-DP) platform associated with the mobile network operator;
retrieving, by the computing device from the SM-DP platform, an embedded subscriber identity module (eSIM) profile responsive to the user of the mobile device being authenticated with the SM-DP platform using the identity token, the identity token facilitating access to the eSIM profile;

responsive to retrieving the eSIM profile from the SM-DP platform, generating, by the computing device via the blockchain network, a second non-fungible token, wherein the second non-fungible token comprises the eSIM profile associated with the mobile network operator providing network services for the mobile device, the second non-fungible token configured to provide the mobile device with access to the eSIM profile; and causing, by the computing device, the mobile device to be registered with the mobile network operator by causing the mobile device to download, from the blockchain network, the second non-fungible token using the identity token, unpack the eSIM profile from the second non-fungible token, and install the eSIM profile.

10. The method of claim 9, further comprising:

storing, by the computing device, the second non-fungible token on a blockchain ledger associated with the blockchain network.

11. The method of claim 9, further comprising:

generating, by the computing device, the identity token for the user of the mobile device via the blockchain network; and storing, by the computing device, the identity token on a blockchain ledger associated with the blockchain network.

12. A non-transitory computer readable medium comprising instructions which, when executed by a computing system associated with a mobile network operator, cause the computing system to perform operations, comprising:

retrieving, by the computing system, an identity token from a blockchain network, wherein the identity token is a first non-fungible token uniquely identifying a user of a mobile device to be registered with the mobile network operator;

authenticating, by the computing system, the user of the mobile device with a subscription manager data preparation (SM-DP) platform associated with the mobile network operator;

retrieving, by the computing system from the SM-DP platform, an embedded subscriber identity module (eSIM) profile responsive to the user of the mobile device being authenticated with the SM-DP platform using the identity token, the identity token facilitating access to the eSIM profile;

responsive to retrieving the eSIM profile from the SM-DP platform, generating, by the computing system via the blockchain network, a second non-fungible token, wherein the second non-fungible token comprises the eSIM profile associated with the mobile network operator providing network services for the mobile device, the second non-fungible token configured to provide the mobile device with access to the eSIM profile; and causing, by the computing system, the mobile device to be registered with the mobile network operator by causing the mobile device to download, from the blockchain network, the second non-fungible token using the identity token, unpack the eSIM profile from the second non-fungible token, and install the eSIM profile.

13. The non-transitory computer readable medium of claim 12, further comprising:

storing, by the computing system, the second non-fungible token on a blockchain ledger associated with the blockchain network.

14. The non-transitory computer readable medium of claim 12, further comprising:

generating, by the computing system, the identity token for the user of the mobile device via the blockchain network; and storing, by the computing system, the identity token on a blockchain ledger associated with the blockchain network.

\* \* \* \* \*